United States Patent Office 3,362,496
Patented Jan. 9, 1968

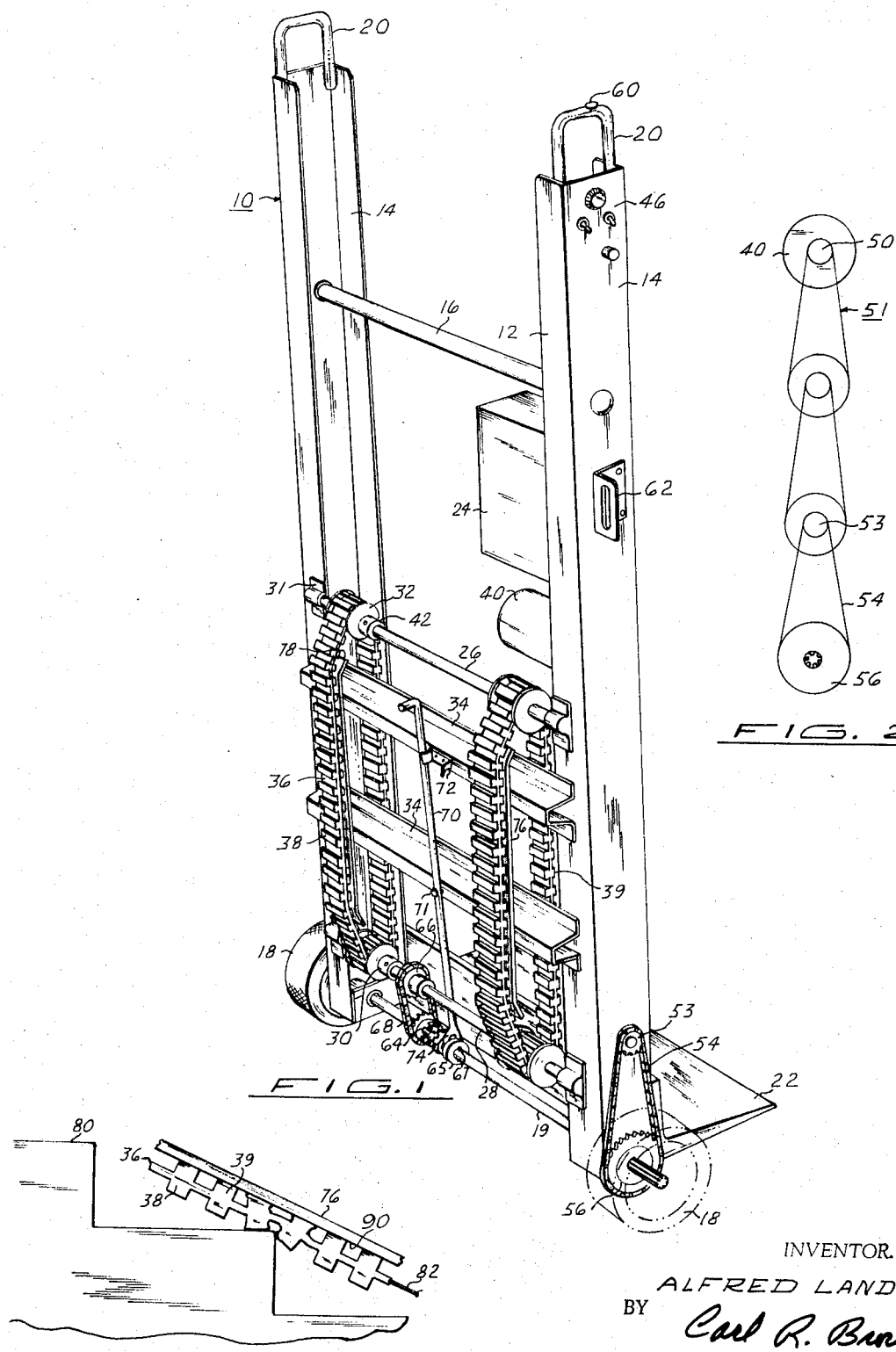

3,362,496
POWER DRIVEN DOLLY
Alfred Landry, Lemon Grove Calif., assignor to Grove Automation Company, Inc., San Diego, Calif., a corporation of California
Filed Aug. 5, 1965, Ser. No. 477,368
2 Claims. (Cl. 180—9.22)

ABSTRACT OF THE DISCLOSURE

This power driven dolly has an endless flexible belt with spaced aligned teeth on each side that abut a frictionless backing surface. The belt is moved and the teeth flex, gripping the edges of obstacles such as stairs or the like, and the dolly is propelled over the obstacle.

There are many hand trucks, dollies and the like that have special structure for moving the dolly over objects or up stairs. These prior art devices in general use rollers or belts to reduce the friction of the hand truck or dolly's movement. The particular adaptation of turning the rollers or belts by power means has been a more recently desired capability. However, the known dollies, hand trucks and the like that are capable of power movement over objects and in climbing up stairs are inefficient and cumbersome. Further they are complicated and usually require some rather impractical means of contacting the object or the stairs to base a force position for moving the dolly. Many of the devices for contacting the objects use means that are destructive to the stairs or objects. This not only mars the object but because of the poor gripping surface and the considerable weight, the dolly is often not able to move the load up the stairs or over the object.

It is therefore an object of this invention to provide a novel and improved power-driven dolly that is capable of moving loads over objects and in climbing up stairs.

It is another object of this invention to provide a novel and improved power-driven dolly with stair climbing capability that is simple and efficient in operation and relatively inexpensive and uncomplicated in construction.

It is another object of this invention to provide a novel and improved power-driven stair-climbing dolly that is able to efficiently and without slippage move the dolly with load up stairs in a manner that does not destroy or mar the stairs.

My invention for accomplishing the foregoing, in general description has a longitudinal frame with the normal load carrying L shaped member at one end. The L shaped member supports the load in the well known hand manner of trucks and dollies. Mounted adjacent the L shaped member are wheels that are driven by a motor through a sprocket and chain drive mechanism. Positioned on the side of the frame opposite the aforesaid load carrying side, are a pair of shafts having sheaves for holding a pair of endless belts. These belts are capable of rotational movement in a longitudinal direction that is substantially parallel with the longitudinal frame members and that is spaced from the longitudinal members in a manner that facilitates the belt in contacting objects or the like without interference from the frame member.

The belts are flexible and yet resist elongations. They have teeth spaced longitudinally therealong on both sides. The frame has a rigid longitudinal backup member for each belt that assures a rigid backing to the flexible belt member in its longitudinal movement along the frame member and in its contact with the object and stairs to be climbed. The belt is rotated by the power driving mechanism that moves the belt in the normal manner wherein the teeth work as treads to pull the dolly along over objects and in climbing up stairs. The particular belt construction, being a resilient flexible structure, has a particular novel aspect in climbing stairs or going over objects in that it grips the stairs or objects. When the belt surface contacts the pointed edge of stairs, usually the edge falls between the teeth. This digs in the space between the teeth causing the ends of the teeth to come together. Since the belt does not stretch or elongate, the space between the teeth decreases, thereby increasing the gripping action of the outer teeth on the stairs, objects or the like increasing the force transmitting capability. This concave bending action of the belt and its soft and non-marring teeth coact to move the dolly up the stairs without damage to the edge of the stairs, the carpets on the stairs, or the like.

While the foregoing embodiment has been described relative to stairs, it should be recognized that the capability of this invention will manifest itself in moving over other type objects that have pointed or rather sharp projecting edges or surfaces.

Other objects and advantages will become more apparent during the course of the following description and in the drawing where like numerals are used to designate like parts throughout:

FIGURE 1 is a perspective elevational view of an embodiment of this invention.

FIGURE 2 is a schematic of the drive mechanism.

FIGURE 3 illustrates the gripping action of the belt teeth.

Referring now to FIGURE 1, there is shown a specific embodiment of the power-driven dolly 10 of this invention. The dolly 10 has a pair of longitudinal frame members 14 that may be made of U-shaped steel beam members. A rod 16 holds the upper end of the frame members together. Handles 20 are attached to the upper end of members 14 by welding or the like. The other end of the dolly 10 has a shaft member 19 that passes through the beam members 14 and functions in the normal manner of an axle member for the wheels 18. On the upper surface of the lower portion of the frame members 14 is mounted an L shaped plate 22 for aiding in carrying loads on the dolly in the well known manner. Strap hangers 62 receive the tie down straps.

The dolly is power driven, that is, it has a motor for turning the wheels 18. In the specific embodiment, the motor 40 is an electric motor that may either be supplied power from a commercial power source through an electrical extension cord (not shown) or be supplied power from a rechargeable battery 24. The electric motor 40 turns a drive linkage shown schematically in FIGURE 2. The actual drive mechanism is positioned in one of the frame members 14 and connects with sprocket 53 that drives sprocket 56 through chain 54. Sprocket 56 meshes with the splines on shaft 19 and turns shaft 19 and the wheels 18.

The drive mechanism 51 comprises a series of sprockets and chains that reduce the speed of the motor 40 through sprocket 50 to that speed required to propel the dolly 10. The electrical circuit controlling the motor (not shown) has various well known switching arrangements for turning the motor 40 on and selectively varying the speed of the dolly. A finger operated push button 60 generally energizes the motor or functions as an override control over the switches 46.

Interconnecting the longitudinal frame members 14 are a pair of shafts 26 and 28 and beam members 34. The shafts are supported on the frame members 14 by hangers 31 that also form bearings for the ends of the shafts. The shafts 26 and 28 have sheaves 32 mounted thereon which sheaves are held in position by locking collars 42. An endless flexible belt is carried by the sheaves 32 and the sides of the sheaves 32 retain the belt thereon.

A driving mechanism for moving the endless belts uses a power take-off from axle 19 that normally turns wheels 18. Shaft 19 has a sprocket 64 that through a chain 68 turns sprocket 66 that is fixed to shaft 28. Shaft 28 in turn rotates power sheaves 30. Sheaves 30 have cogs that mesh with the teeth 39 on the inner surface of endless belt 36 and thus when sheaves 30 are rotated the endless belt 36 is moved. Sheaves 32 also may have cogs that mesh with teeth 39 and thus maintain alignment of the belts 36 in their joint movement.

The belt drive has a dog clutch mechanism for selectively engaging sprocket 64 with the driving gear 65. Driving gear 65 is keyed to shaft 19 and is moved thereon by rod 70. Rod 70 pivots around pin 7 and the fork end 74 engages and moves driving gear 65 into and out of driving engagement with sprocket 64. Driving gear 65 has a stop-pin that limits its movement along axle 19 in a direction away from the sprocket 64. Sprocket 64 has a similar stop means for fixedly positioning its location axle 19. A clasp 72 functions to hold the clutch actuating rod 70 in the engaging or non-engaging position.

The endless belt 36 may be made of flexible material such as neoprene or the like. The belt is relatively thin and has teeth projecting from both sides. A single layer of cabled steel wire that is continuously wound and molded in the neoprene forms the core of the belt and gives it strength without bulk or stiffness and further prevents elongation of the belt. The teeth 38 and 39 may be made of moderately hard neoprene compound and molded integrally with the neoprene encased wire tension members. Neoprene-impregnated nylon fabric may serve as a facing.

Once the endless belts are mounted on sheaves 30 and 32, there is little or no slack in the belt. However, in carrying loads up stairs or over objects, the belt could still sag a certain amount. To prevent this and for other reasons that will become more apparent hereafter, the belts have backing members 76 that may be made of metal bar stock such as steel or the like. The backing members are substantially flat except for the ends that are angled to prevent engagement with the teeth on the belt. The backing members are rigidly secured to the dolly frame by being fixed to beams 34 by well known attaching means such as welding, bolting or the like. There are no raised edges on the backing members to hold the belt thereon because the belt is held in alignment by the sheaves 30 and 32 and also because the belt does not elongate appreciably. The backing members have a thin coating of Teflon 90 on the surface adjacent the belt. This coating reduces the friction between the belt and backing members 76, allowing the belt to move over the surface with relative ease even when carrying a load. While a Teflon coating is preferred, other suitable friction reducing coatings may be used.

The spacing of the teeth 38 nd 39 along the longitudinal length of the belt 36 may be selectively varied. The teeth form a gripping means for gripping objects over which the dolly moves loads. For example, referring to FIGURE 3, the belt, teeth and backing plate are shown coacting in gripping the stair of stairs being climbed. The edge of the stairs fits in between the teeth causing the outward surface of the teeth to move toward each other. As may be seen, the belt gathers slightly and assumes a concave curve with the outer teeth gripping the stairs. Because the teeth are not hard enough to cut into the stairs, the gripping action permits a non-marring base from which a moving force can be thrust to move the dolly and load.

*Operation*

In operation, a load is placed on the dolly in the well known manner. The motor 40 is energized and the drive wheels 18 propel the dolly and load with the operator guiding the movement of the dolly by hand grips 20. When an object is encountered that the wheels 18 cannot roll over or up, such as stairs, then the dolly and load are manipulated so that the belt 36 is resting on the object. The belt drive is engaged and by moving the rod 70 in the manner previously described and forcing driving gear 65 into engagement with sprockets 68, the speed of movement of the belt may be selectively varied through adjustment of switches 46. The teeth 38 of the belt will by friction move the dolly and load over most objects. In climbing stairs the teeth 38 grip the stairs and pull the dolly and load up the stairs without marring the surface of the stairs.

As may be seen, various modifications may be resorted to by those skilled in the art without departing from the scope of the invention as disclosed and hereinafter defined by the appended claims.

I claim:
1. A power driven dolly comprising,
a pair of longitudinal frame members,
means for holding said frame members in spaced parallel positions,
wheel means for rollably moving said dolly,
an axle secured to adjacent ends of said frame members for supporting said wheel means,
driving means for turning sair axle and moving said dolly,
endless flexible belt means for moving said dolly over obstacles,
a pair of shafts mounted in spaced relationship on said frame members and having sheave members for carrying said belt means in a substantially parallel and spaced position with said frame members,
beam means mounted between said frame members,
longitudinal rigid plate means fixed to said beam means and having a friction reducing surface for backing said belt means,
said belt means having spaced projecting teeth longitudinally positioned along the length thereof and on both sides,
said teeth being aligned substantially normal to said longitudinal length and said teeth on the inside surface coacting with at least one of said sheaves,
selectively actuatable drive connecting means for turning one of said shaft means in response to movement of said axle means thereby moving said belt means,
and each of said teeeth on both sides of said belt being positioned directly across from one another.
2. A power driven dolly comprising,
a pair of longitudinal frame members,
means for holding said frame members in spaced parallel positions,
wheel means for rollably moving said dolly,
an axle secured to adjacent ends of said frame members for supporting said wheel means,
driving means for turning said axle and moving said dolly,
endless flexible belt means for moving said dolly over obstacles,
a pair of shafts mounted in spaced relationship on said frame members and having sheave members for carrying said belt means in a substantially parallel and spaced position with said frame members,
at least a pair of beam members mounted between said frame members,
longitudinal rigid plate means fixed to said beam members and having a Teflon coated surface for backing said belt means,
said belt means having spaced projecting teeth longitudinally positioned along the length thereof and on both sides,
said teeth being aligned substantially normal to said longitudinal length and said teeth on the inside surface coacting with at least one of said sheaves, and selectively actuatable drive connecting means for turning one of said shaft means in response to movement of said axle means thereby moving said belt means.

References Cited

UNITED STATES PATENTS

| | | | |
|---|---|---|---|
| 2,740,484 | 4/1956 | Montana | 280—5.22 X |
| 2,770,310 | 11/1956 | Gates | 180—9.22 |
| 2,856,015 | 10/1958 | Stefan | 180—9.22 |
| 3,054,467 | 9/1962 | Seiler | 305—35 X |
| 3,092,200 | 6/1963 | Chambers | 180—9.22 |
| 3,127,188 | 3/1964 | Greub | 280—5.22 |
| 3,288,234 | 11/1966 | Feliz | 280—5.22 X |

RICHARD J. JOHNSON, *Primary Examiner.*

BENJAMIN HERSH, *Examiner.*